(12) United States Patent
Fukuda et al.

(10) Patent No.: US 6,197,277 B1
(45) Date of Patent: Mar. 6, 2001

(54) PROCESS FOR PRODUCING ALUMINA PARTICLES HAVING HIGH DISPERSIBILITY AND PLASTICITY

(75) Inventors: Takeshi Fukuda; Ryuichi Shido, both of Kurobe (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/304,341

(22) Filed: May 4, 1999

Related U.S. Application Data

(62) Division of application No. 08/697,470, filed on Aug. 23, 1996, now Pat. No. 6,015,456.

(30) Foreign Application Priority Data

Aug. 24, 1995 (JP) .................................................... 7-237882
Nov. 17, 1995 (JP) .................................................... 7-322411

(51) Int. Cl.$^7$ ...................................................... C01F 7/02
(52) U.S. Cl. ........................ 423/628; 423/266; 423/625; 423/626
(58) Field of Search ................................. 423/266, 626, 423/625, 628

(56) References Cited

U.S. PATENT DOCUMENTS 3,628,914 * 12/1971 Graulier ............................... 423/625
4,797,139 * 1/1989 Bauer ................................... 423/628
5,306,680 * 4/1994 Fukuda ................................ 423/625
6,015,456 * 1/2000 Fukuda ................................ 423/625

FOREIGN PATENT DOCUMENTS 61-036120 * 2/1986 (JP) .

* cited by examiner

Primary Examiner—Tom Dunn
(74) Attorney, Agent, or Firm—Finnegan, Henderson, Farabow, Garrett & Dunner, L.L.P.

(57) ABSTRACT

Alumina particles having high dispersibility and plasticity, at least on the surface of which a phosphoric acid or phosphate is present and suitable for use as a material for pigments for paints, precision abrasives or ceramics. The alumina particles are produced by adding a crystallization inhibitor containing at least phosphate ion to aluminum hydroxide or alumina hydrate and then conducting a hydrothermal synthesis treatment. The amount of the phosphate ion to be added is in the range of $3.0 \times 10^{-3}$ to $2.5 \times 10^{-2}$ mol per mol of aluminum hydroxide or alumina hydrate. The particle size of aluminum hydroxide or alumina hydrate is 0.1 to 5.0 $\mu$m. The hydrothermal synthesis is preferably conducted at 350° C. or above under a pressure of 50 to 200 atm and at a temperature elevation rate of 5° C./min to 0.3° C./min. The thus obtained alumina is $\alpha$-alumina in the form of hexagonal plate single crystal having a particle size of 0.2 to 15 $\mu$m, an aspect ratio of 15 to 50 and an isoelectric point at which the zeta-potential is 0 of pH 4 to 8.

8 Claims, 2 Drawing Sheets

PROCESS FOR PRODUCING ALUMINA PARTICLES HAVING HIGH DISPERSIBILITY AND PLASTICITY

This is a division of application Ser. No. 08/697,470, filed on Aug. 23, 1996, now U.S. Pat. No. 6,015,456 which is incorporated herein by reference.

BACKGROUND OF THE INVENTION

1. Field of the Invention

The present invention relates to plate alumina particles having high dispersibility and plasticity and suitable for use as a base of pigments, particularly pearl pigments, for paints; extender pigments for cosmetics; a precision abrasive; a starting material for ceramics, etc. The present invention relates also to a process for efficiently producing the plate alumina particles by a hydrothermal synthesis treatment.

2. Description of the Prior Art

Alumina has been widely used hitherto on an industrial scale as a typical material for ceramics as described below. Although various properties are required of alumina depending on the use thereof, alumina particles produced hitherto not always satisfied these requirements.

For example, when alumina is used as a pigment for a paint or as a precision abrasive, it is used mostly in the form of an aqueous slurry thereof so as to homogenize the particles in the step of producing the starting material or mixing with another material. In such a case, the starting powder must be completely dispersed to primary particles in order to exhibit the properties and function of the starting material to the maximum.

As is well known, the plate particles exhibit masking properties and particle orientation superior to those of granular particles when they are used as a material for a pigment. Thus, the plate particles are desirable particularly for use as the base of pearl pigments. However, these properties cannot be obtained when the particles are in an agglomerate form. Therefore, the powder is freed from the agglomeration by pulverization or cracking in the presence of a dispersant with a wet-type ball mill or the like for a long period of time.

On the other hand, when $\alpha$-alumina is used as a material for ceramics, particularly as a material for plastic molding, its plasticity is lower than that of a natural high-quality clay. Such a problem is solved mostly by mixing or incorporating an organic matter or a binder having a water retentivity as a molding assistant.

A fundamental requirement for realizing the coloring function is that the primary particles are stably dispersed as pigment particles in the paint thus obtained. When the pigment particles agglomerate due to insufficiency in stability, color segregation, color shift and pigment sedimentation are caused.

When the pigment sediments, the resultant agglomerate contains the vehicle and fixes it therein to seriously increase the apparent volume of the pigment and also to increase the viscosity. In such a case, the agglomerate structure is broken by a shearing force in the coating step to significantly change the flow properties of the paint by the shearing force. The dependency of the flow properties on the shearing causes a serious reduction in workability in the coating step.

Also when alumina particles are used as the abrasive, the agglomerate particles cause reduction in the abrading properties and particularly in the polishing step which is the final step in the abrasion, the lubricity and specular surface properties of the finished surface are seriously impaired.

When alumina particles are used as a plastic molding material for ceramics, an organic substance is also used as the molding assistant. In such a case, the adhesion of the blended material is too high disadvantageously in a high water content zone in the plasticization water content range. Thus, only a low water content zone in the plasticization water content range is usable and, therefore, the molding pressure is made high thereby to limit the molding machine used and the like disadvantageously. It was considered that organic substances remaining undecomposed in the sintering step make the production of dense alumina ceramics by the plasticization molding difficult.

Under these circumstances, an alumina material capable of keeping its shape without using any molding assistant and having only a low adhesion like a natural clay is eagerly demanded.

Various processes are known hitherto for the production of alumina particles. Particularly, investigations on the production of highly pure alumina particles are remarkable. These processes are typified by, for example, thermal decomposition of ammonium alum, hydrolysis of an organometal, ethylene chlorohydrin process, spark discharge of aluminum in water, ammonium aluminum carbonate heat-decomposition (AACH), modified Bayer's process and gas phase oxidation process. For the production of alumina particles on a large industrial scale, ordinary Bayer's process is most common. Although the processes for producing highly pure alumina are characterized in that the alumina particles thus synthesized has a purity of as high as 4N or 5N, these processes have a problem that the cost must be reduced. On the other hand, Bayer's process is characterized by a low cost, since it is a mass production process. However, this process also has problems that the production of the highly pure product is difficult, that a mechanical means such as a ball mill or medium stirrer mill is necessitated for obtaining the fine particles and that the particles are contaminated in the pulverization step. Although the alumina particles produced by the above-described processes are generally very fine, their shapes are inclined to be granular or irregular.

For the production of the plate alumina particles, a process wherein a mineralizer such as aluminum fluoride is added in a step of calcination of the starting material as described in, for example, Japanese Patent Publication No. 6977/1960 is known. Further, for the production of alumina particles by a hydrothermal synthesis method, a process described in, for example, Japanese Patent Publication No. 7750/1962 is known.

However, when the plate alumina particles are produced by the above-described process with a mineralizer (Japanese Patent Publication No. 6977/1960) or the hydrothermal synthesis method (Japanese Patent Publication No. 7750/1962), the control of the size of the alumina particles thus produced is difficult and, particularly, the control of the thickness of the plate particles for thinning them is very difficult. When plate particles having such a low aspect ratio (particle size/thickness of plate particle) are used as a base for pigments, particularly pearl pigments, for paints or as extender pigments for cosmetics or the like, the orientation of the particles is poor; and in the former, the light reflection is nonuniform to make the realization of pearly feeling difficult and in the latter wherein the plate particles are used as the extender pigments for cosmetics or the like, the adhesion to the skin and spreading become poor. Thus, the problem is that the essential properties of the plate particles are difficultly realized.

Even when the plate alumina particles are obtained, the dispersibility and plasticity of them are actually insufficient for obtaining satisfactory results.

SUMMARY OF THE INVENTION

Therefore, the object of the present invention is to provide plate alumina particles having a high aspect ratio and exhibiting high dispersibility and plasticity, and also a process for efficiently producing such plate alumina particles.

After intensive investigations on the interaction between the particle surface of the alumina powder and the solvent, particularly an aqueous solvent, made for the purpose of realizing high dispersibility and plasticity of simple alumina powder under the above-described circumstances, the inventors have found that plate alumina particles having high dispersibility or plasticity can be obtained when a very small amount of a phosphoric acid or phosphate is present at least on the surface of the alumina particles. The present invention has been completed on the basis of this finding.

In the present invention, the phosphoric acid or phosphate is present in an amount of preferably 0.1 to 3.0% by weight (in terms of $P_2O_5$) based on the alumina particles, and the alumina particles are hexagonal plate crystals having a single crystal structure of α-alumina. More particularly, the alumina particles preferably have a particle size of 0.2 to 15 μm and an aspect ratio (particle size/thickness) of 15 to 50. Further, it is preferred from the viewpoint of dispersibility that the isoelectric point of the alumina particles at which zeta-potential is zero exhibit a pH of 4 to 8.

After intensive investigations made for the purpose of producing such plate alumina particles of the present invention by a hydrothermal synthesis method, the inventors have found that thin plate particles, i.e. those having a high aspect ratio, can be efficiently produced by controlling the production conditions including the additive in a hydrothermal synthesis of aluminum hydroxide or alumina hydrate such as boehmite. Namely, the first process of the present invention is a process for producing alumina particles, comprising adding a crystallization inhibitor containing at least phosphate ion to aluminum hydroxide or alumina hydrate and then conducting a hydrothermal synthesis treatment.

The second process of the present invention for producing plate alumina particles having high dispersibility and plasticity comprises obtaining plate alumina particles by a well-known process and then stirring and mixing the alumina particles with an aqueous phosphate solution including at least phosphate ion to coat the alumina particle surface with the phosphoric acid or phosphate.

DETAILED DESCRIPTION OF THE PREFERRED EMBODIMENTS

Figure 1:
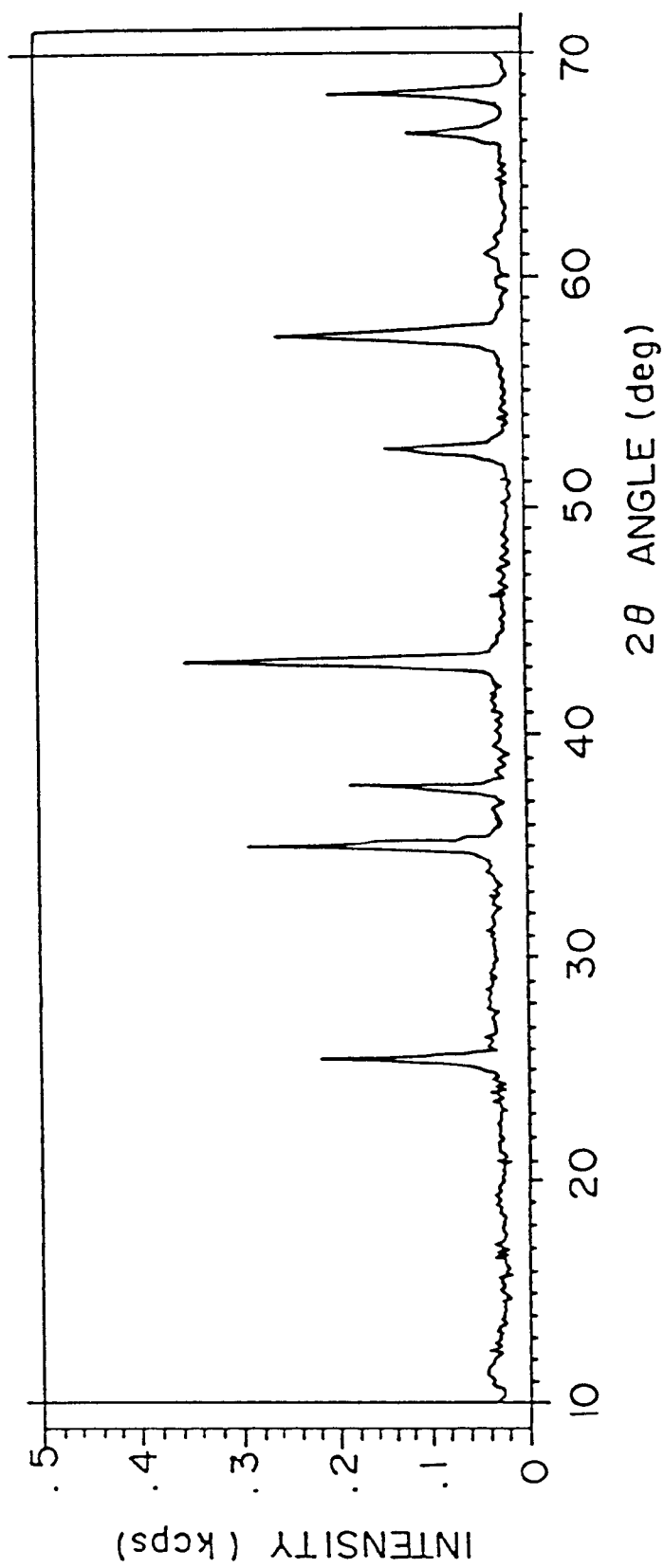
FIG. 1 is a graph showing the results of X-ray diffraction of powder particles obtained in Example 1.
Figure 2:
FIG. 2 is an electron photomicrograph showing the crystal structure of the particles obtained in Example 1.

In the first process of the present invention for producing alumina particles, aluminum hydroxide or alumina hydrate such as boehmite used as the starting material is previously pulverized in a ball mill or medium stirrer mill to control the particle size thereof, and the particles having a size of 0.1 to 5.0 μm, preferably 0.3 to 3.0 μm, are used as starting material particles. In order to control the particle size as desired, the starting material having a particle size in the above-described range must be used, since the particle size of the starting material is related to that of the synthesized α-alumina particles.

The phosphate ion is usually preferably used in the form of an aqueous phosphoric acid solution in the present invention. As a matter of course, water-soluble compounds may be also used. Such compounds may be in the form of its salt with an alkali metal such as sodium or potassium, orthophosphate such as ammonium phosphate or various condensed phosphates such as hexametaphosphate or orthometaphosphate obtained by the dehydration condensation of such compounds.

To obtain the α-alumina particles in the form of thin plate single crystal according to the present invention, it is necessary to add the phosphate ion in an amount in the range of $3.0 \times 10^{-3}$ to $2.5 \times 10^{-2}$ mol, preferably $5.0 \times 10^{-3}$ to $1.2 \times 10^{-2}$ mol, per mol of aluminum hydroxide. When the phosphate ion is added in an amount not within this range, the intended thin plate α-alumina particles cannot be obtained. In particular, when the amount of the phosphate ion is insufficient, the obtained α-alumina particles are in the form of thick particles. On the contrary, when it is excess, the reaction rate and the yield of α-alumina are low.

For the hydrothermal synthesis treatment according to the present invention, an aqueous slurry containing the above-described starting material and additive is obtained by mixing them with water. The combined concentration of the starting material and the additive in slurry concentration is preferably 1 to 60% by weight, more preferably 20 to 50% by weight. The slurry is fed into a pressure vessel to conduct the hydrothermal synthesis. The hydrothermal synthesis temperature is preferably 350° C. or above, more preferably in the range of 450 to 600° C., and the synthesis pressure is preferably in the range of 50 to 200 atm, more preferably 75 to 150 atm. The synthesis time is preferably in the range of 5 min to 10 h, more preferably 30 min to 4 h.

The temperature and pressure conditions in the hydrothermal synthesis must be such that α-alumina can be kept stable in a phase diagram of $Al_2O_3$—$H_2O$. The reason why the lower limit of the temperature is 350° C. is that α-alumina cannot be obtained at a temperature below 350° C. Although the upper limit of the temperature is not particularly provided, the temperature range is preferably provided from the economic viewpoint of the apparatus.

The reason why the pressure is limited to 50 to 200 atm is that the intended crystal structure of α-alumina which is thin plates cannot be obtained and the product is mostly in the form of particles having a crystal structure of γ-alumina under a pressure below this range. Under a pressure above 200 atm, the product is not in the form of thin plates but in the form of thick particles, though it has the crystal structure of α-alumina.

The reason for limiting the temperature-elevation rate in the range of 5° C./min to 0.3° C./min is that the higher the temperature-elevation rate, the finer the formed α-alumina particles. When the temperature-elevation rate is below or above this range, the intended effect cannot be obtained. Thus, this range is industrially preferred.

By the process of the present invention, α-alumina particles in the form of hexagonal crystals of which the surfaces at right angles to the C axis were grown to a plate-like form can be obtained. Further, the particle size and aspect ratio of the particles can be controlled to 0.2 to 15 μm and 15 to 50, respectively.

The α-alumina particles thus obtained are usable as starting alumina material capable of realizing the particle orientation in the fields of a base for inorganic pigments, particularly pearl pigments, for paints, extender pigments for cosmetics and ceramic moldings. The phosphoric acid or phosphate is present preferably in an amount of 0.1 to 3.0% by weight (in terms of $P_2O_5$) based on the alumina particles.

In the second process of the present invention for obtaining the alumina particles having a phosphoric acid or phosphate adsorbed on only the surface thereof, plate alumina particles are prepared by a well-known method described in, for example, Japanese Patent Laid-Open No. 17132/1993, the obtained alumina particles are stirred together with an aqueous solution containing phosphate ion for a whole day and night. The obtained mixture is washed with pure water, filtered and dried. Namely, the alumina particles thus obtained comprise α-alumina the surface of which is coated with the phosphoric acid or phosphate.

The structure of the phosphoric acid or phosphate on the surface of the alumina particles of the present invention or in the whole particles including the surface thereof is supposed to be that forming an intermediate of aluminum phosphate. It is characterized in that it is amorphous and cannot be identified by X-ray diffraction. Since it is thus amorphous, it does not exert any influence on the crystal structure of α-alumina.

The following Examples will further illustrate the present invention, which by no means limit the technical ambit of the invention.

EXAMPLE 1

Aluminum hydroxide to be used as the starting material was previously pulverized with a ball mill to control the particle size to 0.4 μm. Aluminum hydroxide thus treated was mixed with water to obtain a slurry containing aluminum hydroxide in an amount of 50 wt. %.

Ammonium phosphate in an amount of $1.0 \times 10^{-2}$ mol (as phosphate ion) per mol of aluminum hydroxide was added to the slurry and the obtained mixture was thoroughly mixed to obtain a solution.

The starting material obtained as described above was fed into a pressure vessel and the temperature was elevated at a rate of 5° C./min to 600° C. and kept at that point under 75 atm for 3 h.

The vessel was cooled, and the product was thoroughly washed with water, completely filtered and then dried at 100° C. in a dryer for 12 h to obtain a white particulate powder.

The particulate powder thus obtained had only a diffraction peak of α-alumina in the powder X-ray diffraction as shown in FIG. 1. The particles were observed with an electron microscope to find that they were hexagonal plate particles having an average particle size of 0.4 μm, average thickness of 0.013 μm and aspect ratio of 30.

EXAMPLE 2

The same procedure as that of Example 1 was repeated except that aluminum hydroxide having a particle size of 1.0 μm was used as the starting material and that sodium phosphate was added in an amount of $5.0 \times 10^{-3}$ mol (as phosphate ion) per mol of aluminum hydroxide. After the same treatment as that of Example 1 was conducted at a temperature-elevation rate of 1.6° C./min under 100 atm, a white powder was obtained.

The particulate powder thus obtained had only a diffraction peak of α-alumina in the powder X-ray diffraction. The particles were observed with an electron microscope to find that they were hexagonal plate particles having an average particle size of 2.5 μm, average thickness of 0.05 μm and aspect ratio of 50.

EXAMPLE 3

The same procedure as that of Example 1 was repeated except that aluminum hydroxide having a particle size of 3.0 μm was used as the starting material and that an aqueous phosphoric acid solution was added in an amount of $5.0 \times 10^{-3}$ mol (as phosphate ion) per mol of aluminum hydroxide. After the same treatment as that of Example 1 was conducted at a temperature-elevation rate of 0.3° C./min under 150 atm, a white powder was obtained.

Figure 3:
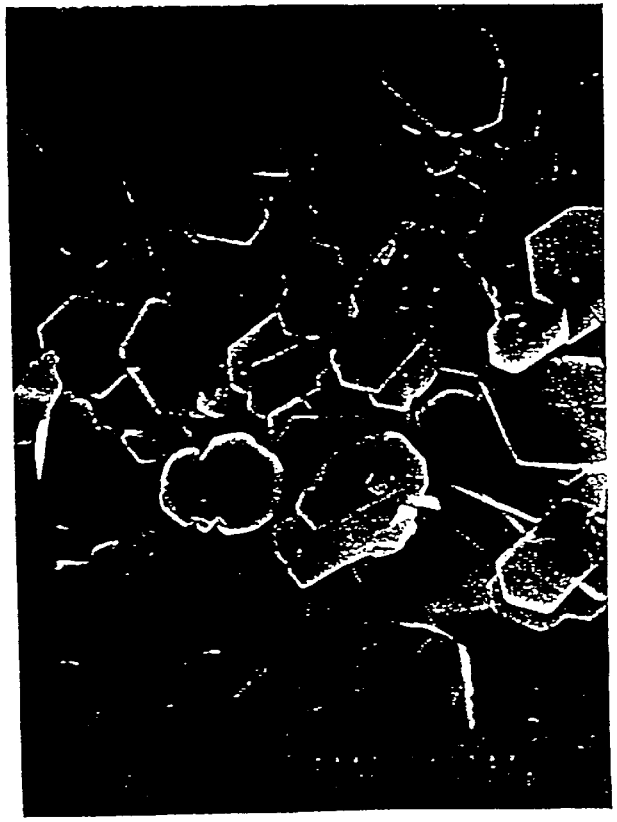
FIG. 3 is an electron photomicrograph showing the crystal structure of the particles obtained in Example 3.

The particulate powder thus obtained had only a diffraction peak of α-alumina in the powder X-ray diffraction. The particles were observed with an electron microscope to find that they were hexagonal plate particles having an average particle size of 10 μm, average thickness of 0.33 μm and aspect ratio of 30 as shown in FIG. 3.

To examine the dispersibility of the sample obtained in Example 1, the zeta-potential of the powder was determined by adding 2 vol. % of alumina to 0.01 N-KCl solution, stirring the obtained mixture overnight and conducting pH titration. The results were: initial pH of 6.26, initial zeta-potential of 7.37 mV and isoelectric point of pH 4.97. It is understood, therefore, that since the slurry of the powder in water has the isoelectric point on acidic side even when no dispersant is used, the particles have a minus electric charge in the neutral zone and thus, the particles are highly dispersed.

EXAMPLE 4

The same procedure as that of Example 2 was repeated except that an aqueous phosphoric acid solution was used to obtain a white powder. The particulate powder thus obtained had only a diffraction peak of α-alumina in the powder X-ray diffraction. The particles were observed with an electron microscope to find that they were hexagonal plate particles having an average particle size of 2.5 μm, average thickness of 0.05 μm and aspect ratio of 5.0.

Comparative Example 1

The same procedure as that of Example 2 was repeated except that the synthesis pressure in the hydrothermal synthesis treatment was altered to 45 atm to obtain a white powder. In the powder X-ray diffraction, the particulate powder thus obtained had almost a diffraction peak of γ-alumina and only a weak diffraction peak of α-alumina.

Comparative Example 2

The same procedure as that of Comparative Example 1 was repeated except that the synthesis pressure in the hydrothermal synthesis treatment was altered to 300 atm to obtain a white powder. The particulate powder thus obtained had only a diffraction peak of α-alumina in the powder X-ray diffraction. The particles were observed with an electron microscope to find that they were roundish granular particles having an average particle size of 2.0 μm, average thickness of 0.4 μm and aspect ratio of 5.

EXAMPLE 5

The particle size of aluminum hydroxide prepared by Bayer's process was adjusted to a median particle size of 0.7 μm as described in Japanese Patent Laid-Open No. 17132/1993. A slurry was prepared from these particles and a specified amount of pure water and then fed into an autoclave to conduct a hydrothermal synthesis treatment at a temperature of 600° C. under a pressure of 200 atm for 2 h.

The product thus obtained was washed with water, filtered and dried to obtain α-alumina. The particles were hexagonal plate particles having an average particle size of 0.6 μm, average thickness of 0.06 μm and aspect ratio of 10. The product was surface-treated by stirring 600 g of this powder with 1.5 liters of 1 N-phosphoric acid solution overnight, washing the product with pure water and filtering and then drying it to obtain the processed powder.

A kneaded product was prepared by controlling the pH of a slurry prepared from the treated powder and pure water to the isoelectric point (pH 4.0). The plastic deformation of the product was determined by a method based on Pfefferkorn method. The sample having a deformation ratio of 3.3 was dried at 40° C. and 100° C. and the percentage water content thereof was determined. The percentage water content in the sample dried at 100° C. was given as a plastic water content (PI) and the percentage of water evaporated during drying from 40° C. to 100° C. was given as percentage water retention (WR). The plastic characteristic value (CV=WR/PI) was calculated from the ratio of WR to PI.

The isoelectric point of the untreated powder and treated powder obtained by the determination of the zeta-potential of them were pH 10.0 and pH 4.0, respectively, the latter being on the acidic side.

The plasticity indices determined by Pfefferkorn method are given in Table 1. It is understood from the results that the treated product had an improved plasticity.

TABLE 1

|  | Plastic water index PI (%) | Water retention WR (%) | Plastic characteristic value CV |
|---|---|---|---|
| Untreated | 38.90 | 0.27 | 0.68 |
| Surface-treated powder | 36.00 | 0.90 | 2.51 |

According to the present invention, plate particles far thinner than conventional plate alumina particles can be efficiently produced. In particular, α-alumina particles in the form of single crystal having a particle size of 0.2 to 15 μm and aspect ratio of 15 to 50 can be produced. When the particles are used as a base for inorganic pigments, particularly pearl pigments, for paints, as extender pigments for cosmetics, as a starting material for ceramics for plastic molding, as a filler to be incorporated into resin materials or the like or as a precision abrasive, the effects of them such as high dispersibility, high plasticity and high orientation are exhibited greatly.

What is claimed is:

1. A process for producing alumina particles having dispersibility and plasticity, comprising adding a crystallization inhibitor containing at least phosphate ion to aluminum hydroxide or alumina hydrate and then conducting a hydrothermal synthesis treatment;

wherein the alumina particles are in the form of hexagonal plate crystals having a single crystal structure of corundum; and wherein the alumina particles have a particle size of 0.2 to 15 μm and aspect ratio, particle size/thickness, of 15 to 50.

2. The process for producing alumina particles according to claim 1, wherein the amount of phosphate ion is in the range of $3.0 \times 10^{-3}$ to $2.5 \times 10^{-2}$ mol per mol of aluminum hydroxide or alumina hydrate.

3. The process for producing alumina particles according to claim 1, wherein aluminum hydroxide or alumina hydrate having a particle size of 0.1 to 5.0 μm is used.

4. The process for producing alumina particles according to claim 1, wherein the hydrothermal synthesis treatment is conducted at a temperature of 350° C. or above under a pressure of 50 to 200 atm.

5. The process for producing alumina particles according to claim 1, wherein the temperature-elevation rate in the hydrothermal synthesis treatment is in the range of 5° C./min to 0.3° C./min.

6. The process for producing alumina particles according to claim 1, wherein alumina particles in the form of hexagonal plate crystals having a single crystal structure of α-alumina are produced by the hydrothermal synthesis treatment.

7. The process for producing alumina particles according to claim 1, wherein alumina particles have a particle size of 0.2 to 15 μm and aspect ratio, particle size/thickness, of 15 to 50.

8. A process for producing alumina particles having dispersibility and plasticity, comprising stirring and mixing plate alumina particles with an aqueous solution including at least phosphate ion to coat the alumina particle surface with the phosphoric acid or phosphate;

wherein the alumina particles are in the form of hexagonal plate crystals having a single crystal structure of corundum.

* * * * *